United States Statutory Invention Registration [19]

[11] Reg. Number: H944

Wade, Jr. et al.

[43] Published: Aug. 6, 1991

[54] HETEROGENEOUS COMPOSITE AND METHOD OF MAKING

[75] Inventors: William L. Wade, Jr., Neptune; Robert J. Mammone, South Plainfield, both of N.J.; Michael Binder, Brooklyn, N.Y.

[73] Assignee: The United States of America as represented by the Secretary of the Army, Washington, D.C.

[21] Appl. No.: 431,277

[22] Filed: Nov. 3, 1989

[51] Int. Cl.[5] ..... H01B 3/00

[52] U.S. Cl. ..... 252/500; 525/185; 264/104; 264/216

[58] Field of Search ..... 525/185; 252/500; 264/104, 216

[56] References Cited

U.S. PATENT DOCUMENTS

| | | | |
|---|---|---|---|
| 4,828,756 | 5/1989 | Benton | 252/500 |
| 4,935,164 | 6/1990 | Wessling | 252/500 |

FOREIGN PATENT DOCUMENTS

| | | | |
|---|---|---|---|
| 199046 | 10/1985 | Japan | 525/185 |
| 01694 | 2/1989 | PCT Int'l Appl. | 252/500 |

*Primary Examiner*—Brooks H. Hunt
*Assistant Examiner*—Ngoclan T. Mai
*Attorney, Agent, or Firm*—Michael Zelenka; Roy E. Gordon

[57] ABSTRACT

Freestanding, flexible, heterogeneous composites of insulating polymeric film containing relatively small percentages of an electrically conductive polymer wherein the conductive polymer exists as the dispersed phase are made by dissolving the insulating polymeric material and less than 15 percent by weight of the electrically conductive material in a solvent, casting the resulting solution onto a suitable substrate and slowly evaporating the solution at an elevated temperature.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

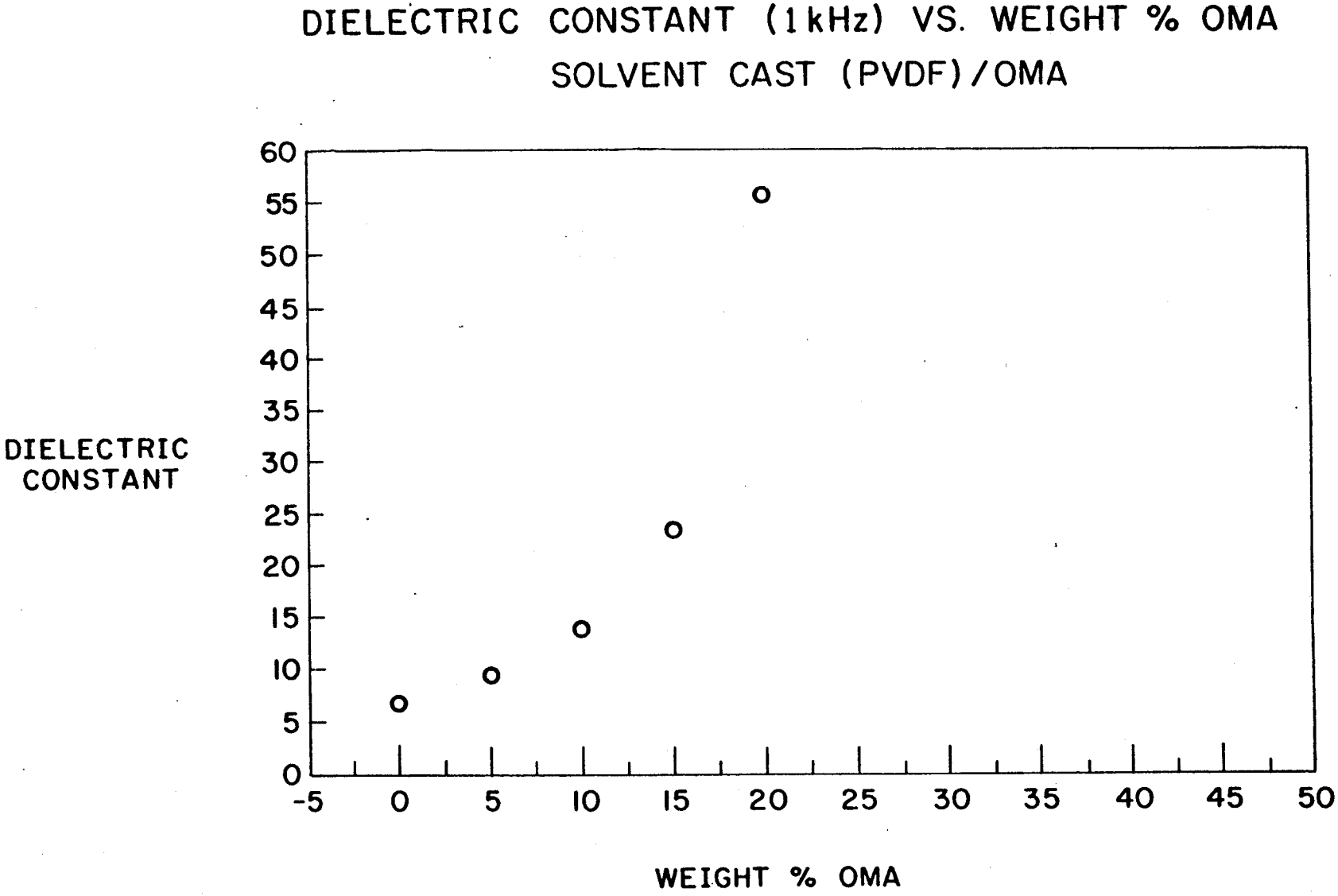
DIELECTRIC CONSTANT (1 kHz) VS. WEIGHT % OMA
SOLVENT CAST (PVDF)/OMA
DIELECTRIC CONSTANT
0
5
10
15
20
25
30
35
40
45
50
55
60
-5
0
5
10
15
20
25
30
35
40
45
50
WEIGHT % OMA

HETEROGENEOUS COMPOSITE AND METHOD OF MAKING

The invention described herein may be manufactured, used, and licensed by or for the Government for governmental purposes without the payment to us of any royalty thereon.

This invention relates in general to heterogeneous composites and to their method of making and in particular to a freestanding, flexible heterogeneous composite of insulating polymeric film containing relatively small percentages of electrically conductive polymer wherein the conductive polymer exists as the dispersed phase and to their method of making.

BACKGROUND OF THE INVENTION

Polymers designed with high dielectric constants, low dissipation factors and high electric field breakdown strengths have application as dielectrics in capacitors for communication equipment, computers, and space power systems. Charge storage in polymer film capacitors are controlled by the dielectric properties such as dielectric constant, dielectric loss, and breakdown strengths of the films employed. For example, poly-vinylidene fluoride (PVDF) and its derivatives and copolymers are known to exhibit the highest dielectric permittivity for commercially available polymeric materials and are quickly becoming useful for a number of applications. PVDF is readily formed as thin sheets and has other good dielectric properties such as high voltage breakdown strengths and low dielectric losses.

There have been numerous studies aimed at increasing the dielectric constant of PVDF films. One study attempted to increase the dielectric constant of PVDF films by forming a composite of PVDF and a high dielectric constant inorganic material such as lead zirconate titanate. The problems with such procedures are that the required percentages of added inorganic material is necessarily large, that is, greater than 20 percent, and overall desirable properties of PVDF film becomes altered. Resulting composite films are also extremely brittle and therefore unprocessable and also have low dielectric breakdown strengths making them unsuitable as dielectrics for wound capacitor applications.

SUMMARY OF THE INVENTION

The general object of this invention is to provide a freestanding, flexible, heterogeneous composite of insulating polymeric film in which the dielectric constant of the insulating polymeric film is increased without altering the overall desireable properties of the insulating polymeric film. A more particular object of the invention is to provide a freestanding, flexible, heterogeneous composite of PVDF in which the dielectric constant of the PVDF is increased without altering the overall desirable properties of PVDF.

It has now been found that the aforementioned objects can be attained by forming freestanding, flexible, heterogeneous composites of insulating polymeric film containing relatively small percentages of an electrically conductive polymer wherein the conductive polymer exists a the dispersed phase by dissolving the insulating polymeric film material and less than 20 percent by weight of the electrically conductive material in a solvent, casting the resulting solution onto a suitable substrate and slowly evaporating the solution at an elevated temperature. Embedding or immobilizing these conducting polymers into the PVDF matrix produces dramatic increases in the bulk dielectric constant without sacrificing much of the other desireable bulk properties such as dielectric loss and dielectric breakdown strength of PVDF. The dielectric constant of these formed composites does not increase linearly with concentration of added conductive polymer component. Rather, at a small characteristic concentration, there is a sudden and dramatic increase in dielectric constant.

BRIEF DESCRIPTION OF THE DRAWING

The drawing shows the dielectric constant for various PVDF/OMA freestanding films as a function of weight percentage of OMA. At values near 15 percent OMA by weight, the bulk dielectric constant of the PVDF/OMA film increases sharply and approaches values of approximately 55. This is about seven times as large as the dielectric constant of pure PVDF.

DESCRIPTION OF THE PREFERRED EMBODIMENT

The method of the invention involves preparing thin, freestanding, composite PVDF films by solution casting. In this procedure, both PVDF and the chosen conducting polymer are soluble in the same solvent. Since PVDF is soluble in only a small number of non aqueous solvents, one must carefully choose a conducting polymer that will be compatible with the solvent selected. As an example, poly ortho methoxy aniline, (OMA), was chosen as the conducting polymer and dimethylformamide (DMF) as the solvent. PVDF/OMA films are then solvent cast from DMF solutions containing total solids in the range of 30 grams of polymer/1000 ml. DMF by allowing a quiescent layer of known solution volume and OMA/PVDF ratios to slowly evaporate at elevated temperatures on a flat glass substrate in a known area. Dielectric measurements are then performed on the resulting 30 to 40 micron thick film.

We wish it to be understood that we do not desire to be limited to the exact details of construction shown and described for obvious modifications will occur to a person skilled in the art.

What is claimed is:

1. Method of forming freestanding, flexible, heterogeneous composites of insulating polymeric film containing relatively small percentages of an electrically conductive polymer wherein the conductive polymer exists as the dispersed phase comprising dissolving the insulating polymeric material and less than 15 percent by weight of the electrically conductive material in a solvent, casting the resulting solution onto a suitable substrate and slowly evaporating the solution at an elevated temperature.

2. Method according to claim 1 wherein the insulating polymeric material is poly-vinylidene fluoride.

3. Method according to claim 1 wherein the electrically conductive polymer material is poly ortho methoxy aniline.

4. Method according to claim 1 wherein the solvent is dimethylformamide.

5. Method according to claim 1 wherein the insulating polymeric material is poly-vinylidene fluoride, the electrically conductive polymer material is poly ortho methoxy aniline and the solvent is dimethylformamide.

6. A freestanding, flexible heterogeneous composite of insulating polymeric film containing relatively small percentages of electrically conductive polymer wherein the conductive polymer exists a the dispersed phase.

7. A composite according to claim 6 wherein the electrically conductive polymer is less than 15 percent by weight.

8. A composite according to claim 7 wherein the insulating polymeric material is poly-vinylidene fluoride.

9. A composite according to claim 7 wherein the electrically conductive polymer material is poly ortho methoxy aniline.

10. A composite according to claim 7 wherein the insulating polymeric material is poly-vinylidene fluoride and wherein the electrically conductive polymer is poly ortho methoxy aniline.

* * * * *